(12) United States Patent
Kim et al.

(10) Patent No.: US 11,941,376 B2
(45) Date of Patent: Mar. 26, 2024

(54) AI DIFFERENTIATION BASED HW-OPTIMIZED INTELLIGENT SOFTWARE DEVELOPMENT TOOLS FOR DEVELOPING INTELLIGENT DEVICES

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Won-Tae Kim, Cheonan-si (KR); Young-Jin Kim, Cheongju-si (KR); Deun-Sol Cho, Cheonan-si (KR)

(73) Assignees: Korea University of Technology, Cheonan-si (KR); Education Industry-University Cooperation Foundation, Chungcheongnam-do (KR)

( * ) Notice: Subject to any disclaimer, the term of this patent is extended or adjusted under 35 U.S.C. 154(b) by 358 days.

(21) Appl. No.: 17/542,545

(22) Filed: Dec. 6, 2021

(65) Prior Publication Data

US 2023/0161568 A1    May 25, 2023

(30) Foreign Application Priority Data

Nov. 23, 2021   (KR) .................. 10-2021-0162280

(51) Int. Cl.
| | | |
|---|---|---|
| G06F 8/35 | (2018.01) | |
| G06F 8/10 | (2018.01) | |
| G06F 8/41 | (2018.01) | |
| G06F 8/60 | (2018.01) | |
| G06N 20/00 | (2019.01) | |

(52) U.S. Cl.
CPC ............... *G06F 8/35* (2013.01); *G06F 8/10* (2013.01); *G06F 8/44* (2013.01); *G06F 8/60* (2013.01); *G06N 20/00* (2019.01)

(58) Field of Classification Search
None
See application file for complete search history.

(56) References Cited

U.S. PATENT DOCUMENTS

| 11,741,361 B2 * | 8/2023 | Zheng ................. H04L 41/145 706/26 |
|---|---|---|
| 2018/0268296 A1 * | 9/2018 | Zheng ................. G06N 3/044 |

(Continued)

FOREIGN PATENT DOCUMENTS

CN   114610271 A   *   6/2022

OTHER PUBLICATIONS

Chi et al., "Artificially intelligent device use in service delivery: a systematic review, synthesis, and research agenda," Taylor & Francis Group, 2020. (Year: 2020).*

(Continued)

*Primary Examiner* — Ryan D. Coyer
(74) *Attorney, Agent, or Firm* — McLean IP Global; Jason Y. Pahng

(57) ABSTRACT

A method of providing intelligent software is provided. According to the present disclosure, it is possible to request an optimal AI model on the basis of a pre-trained AI model and meta information of the AI model, and it is possible to easily provide an AI model optimized for an intelligence device by responding to the request by creating a plurality of AI differentiation models from the AI model in accordance with a plurality of differentiation levels.

9 Claims, 4 Drawing Sheets

(56) References Cited

U.S. PATENT DOCUMENTS

2019/0171187 A1* 6/2019 Cella .................. G06N 3/126
2020/0302234 A1* 9/2020 Walters ............. G06F 16/9035

OTHER PUBLICATIONS

Kim et al., "A PoC Service of Intelligent Device in the Smart City : Human Detection," IEEE, 2021. (Year: 2021).*
Venieris et al., "How to Reach Real-Time Ai on Consumer Devices? Solutions for Programmable and Custom Architectures," IEEE, 2021. (Year: 2021).*

* cited by examiner

AI DIFFERENTIATION BASED HW-OPTIMIZED INTELLIGENT SOFTWARE DEVELOPMENT TOOLS FOR DEVELOPING INTELLIGENT DEVICES

CROSS-REFERENCE TO THE RELATED APPLICATION

The application is based on and claims priority under 35 U.S.C. § 119 to Korean Patent Application No. 10-2021-0162280, filed on Nov. 23, 2021, in the Korean Intellectual Property Office, the disclosure of which is incorporated by reference herein in its entirety.

BACKGROUND

The present disclosure relates to a tool and method for developing optimal software for an intelligent

Related Art

As IoT and intelligent semiconductor technologies are developed, the interest in development of On-device AI-based intelligent devices that perform determination and control by themselves is increasing. An edge device of such on-devices means a device of the end node of an IoT service and performs data processing at the end node rather than a central integrated cloud. Accordingly, there is an advantage that it is possible to reduce delay time due to data communication, decrease the costs for cloud operation and communication, and attenuate the problem of data leakage.

In particular, an intelligent device recognizes/determines the states inside/outside the device and performs appropriate control by analyzing sensor data by itself, in addition to the advantage of an edge device, so it is possible to provide an intelligent IoT service in real time.

Many AI models, which were developed in the past, generally require high computing resources including a high-performance GPU and have been developed not in consideration of hardware characteristics of devices on which AI models are mounted. Accordingly, when the AI models are applied as they are to intelligent software that is mounted on specific devices, it is difficult to expect stable and optimal operation due to hardware resource limitation.

Further, in order to develop software optimized for an intelligent device having a specific function, expert knowledge about the AI optimization technology for optimizing AI models included in intelligent software is required in some cases.

SUMMARY

In consideration of the problem described above, it is required to configure optimal AI models in consideration of all of the sizes, calculation amount, and accuracy of models that are mounted to be able to maximally accomplish the target performance of intelligent software on the basis of the hardware specifications of an intelligent device in order to develop intelligent software that is suitable for a development target intelligent device.

In order to solve the problems described above, an objective of an embodiment of the present disclosure is to provide a tool and method of developing AI differentiation-based HW-optimized intelligent software, the tool and method enabling a user, has insufficient knowledge about the AI optimization technology, to easily develop intelligent software.

An objective of an embodiment of the present disclosure is to provide a tool and method of developing AI differentiation-based HW-optimized intelligent software, the tool and method being able to simply implement intelligent software composed of one or more AI models that can be operated in various intelligent devices.

The technical subject to implement in the present disclosure is not limited to the technical problems described above and other technical subjects that are not stated herein will be clearly understood by those skilled in the art from the following specifications.

A method of providing intelligent software according to an embodiment of the present disclosure includes: receiving a pre-trained AI model and meta information of the AI model; creating a plurality of AI differentiation models from the AI model in accordance with a plurality of differentiation levels; performing profiling on the AI differentiation models on the basis of pre-differentiation AI information; storing AI model data, which includes the meta information of the AI model, the AI differentiation models, hardware specifications of the device, and the profile information, into a storage; and receiving demands of a target device, and selecting a first model, which satisfies the demands, from the AI model data stored in the storage, and transmitting the first model to the target device.

The method of providing intelligent software may further include: receiving software meta information including software demands and hardware specifications of a target device; selecting a first AI model that satisfies the software meta information from AI model data stored in the storage; creating software for the target device by combining a software logic included in the software meta information with the first AI model; and converting the combined software into an execution file and transmitting the execution file to the target device to be executable in the target device.

The performing of profiling may be creating profile information including accuracy of the AI differentiation models, and an execution time and a resource use amount according to hardware specifications of a device registered in advance.

The pre-trained AI model may be independent to hardware specifications of a device, and the AI meta information may include the function, size, and accuracy of the AI model.

The differentiation levels may include information of predetermined differentiation range and differentiation number.

Further, the differentiation levels such as the differentiation range and differentiation number may be set in advance by a user who registers the AI model.

The differentiation levels may include any one of light-weighting or heavy-weighting of the AI model, the light-weighting may include at least one of pruning, binarization, quantization, knowledge distillation, neural architecture search, or AutoML, and the heavy-weighting may include at least one of knowledge distillation, neural architecture search, or AutoML.

The method of providing intelligent software may further include: receiving a differentiation request according to a specific demand and limitation according to hardware specifications of the intelligent device, and differentiating the AI model in accordance with the differentiation request when a model that satisfies the hardware specifications of the intelligent device does not exist in the plurality of differentiation models stored in the storage.

A system for providing intelligent software according to an embodiment of the present disclosure includes: an AI model management device that manages an AI model by receiving a pre-trained AI model and meta information of the AI model; and a software development device, when a target device is registered, that selects a first AI model satisfying software meta information, which includes software demands and hardware specifications of the target device, from AI models managed by the AI model management device on the basis of the software meta information, and that packages and transmits the first AI model to the target device to be executable in the target device, in which the AI model management device may include: an AI model differentiator that creates a plurality of AI differentiation models from the AI model in accordance with a plurality of differentiation levels; an AI profiler that performs profiling on the AI differentiation models on the basis of pre-differentiation AI information; and an AI model storage that stores AI model data including the meta information of the AI model, the AI differentiation models, hardware specifications of the device, and the profile information.

The software development device may include: a software analyzer that selects a first AI model satisfying the software meta information from the AI model data stored in the storage; a software combiner that combines software for the target device by combining a software logic included in the software meta information with the first AI model; and a software packager that converts the combined software into an execution file to be executable in the target device.

According to an embodiment of the present disclosure, even a user who has insufficient knowledge about the AI optimization technology can easily develop intelligent software.

Further, according to an embodiment of the present disclosure, it is possible to simply implement intelligent software composed of one or more AI models that can be operated in various intelligent devices.

Further, according to an embodiment of the present disclosure, it is possible to minimize the time and costs for learning expert knowledge and maximize work efficiency by supporting an intelligent device developer and an AI model developer to be able to develop programs and technologies without being dependent to expert knowledge by separately operating an intelligent software development function and an AI model management function.

The effects of the present disclosure are not limited to the effects described above and other effects can be clearly understood by those skilled in the art from the following description.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

Figure 1:
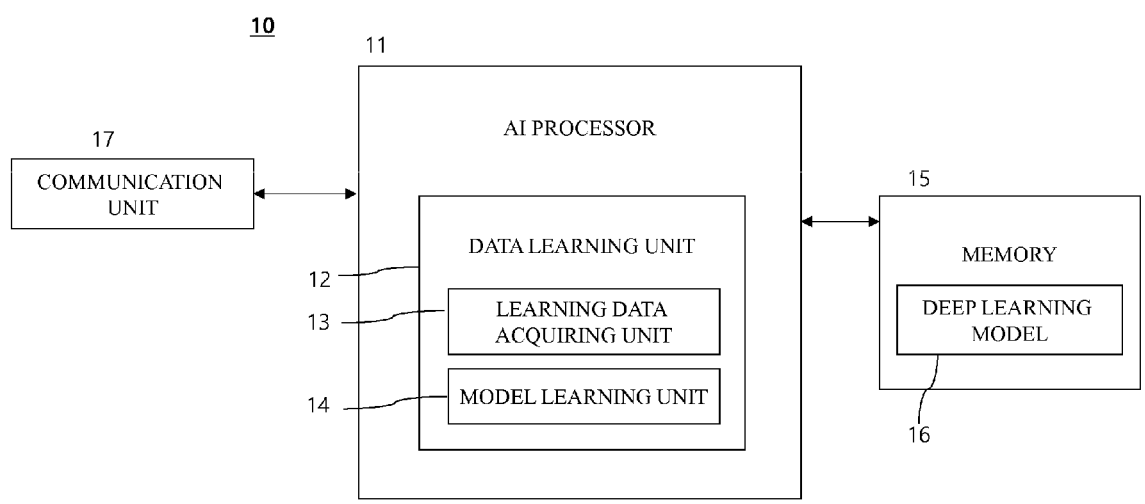
FIG. 1 is a block diagram of an intelligent device provided with intelligent software in accordance with an embodiment of the present disclosure.

Accompanying drawings included as a part of the detailed description for helping understand the present disclosure provide embodiments of the present disclosure and are provided to describe technical features of the present disclosure with the detailed description.

DESCRIPTION OF EXEMPLARY EMBODIMENTS

Hereafter, embodiments of the present disclosure will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present disclosure makes the subject matter of the embodiments described herein unclear, the detailed description is omitted. Further, the accompanying drawings are provided only for easy understanding the embodiments described herein without limiting the spirit described herein and should be understood as including all of changes, equivalents, and substitutes included in the spirit and scope of the present disclosure.

Terms including ordinal numbers such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

FIG. 1 is a block diagram of an intelligent device provided with intelligent software in accordance with an embodiment of the present disclosure. The intelligent device is referred to as an AI device 10.

Referring to FIG. 1, an AI device 20 may include an electronic device including an AI module that can perform AI processing, a server including the AI module, or the like.

The AI device 10 may be a client device that directly uses an AI processing result or a device in a cloud environment that provides an AI processing result to another device. The AI device 10, which is a computing device that can train a neural network, may be implemented as various electronic devices such as a server, a desktop PC, a notebook PC, and a tablet PC.

The AI device 10 may include an AI processor 11, a memory 15, and/or a communication unit 17.

The AI processor 11 can train a neural network using programs stored in the memory 15. In particular, the AI processor 11 can train a neural network for operation of the AI device 10. Here, the neural network for operation of the AI device may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with the connection relationship. The neural network, for example, includes various deep learning techniques such as deep neural networks (DNN), convolutional deep neural networks(CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence leaning.

The memory 15 can store various programs and data for the operation of the AI device 10. The memory 15 may be a nonvolatile memory, a volatile memory, a flash-memory, a hard disk drive (HDD), a solid state drive (SDD), or the like. The memory 15 is accessed by the AI processor 11 and reading-out/recording/correcting/deleting/updating, etc. of data by the AI processor 11 can be performed. Further, the memory 15 can store a neural network model (e.g., a deep learning model 16) generated through a learning algorithm for data classification/recognition according to an embodiment of the present disclosure.

Meanwhile, the AI processor 11 may include a data learning unit 12 that learns a neural network for data classification/recognition. The data learning unit 12 can learn references about what learning data it will use and how to classify and recognize data using the learning data in order to determine data classification/recognition. The data learning unit 12 can learn a deep learning model by acquiring learning data to be used for learning and applying the acquired learning data to the deep learning model.

The data learning unit 12 may be manufactured in the type of at least one hardware chip and mounted on the AI device 10. For example, the data learning unit 12 may be manufactured in a hardware chip type only for artificial intelligence, and may be manufactured as a part of a general purpose processor (CPU) or a graphics processing unit (GPU) and mounted on the AI device 10. Further, the data learning unit 12 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 12 may include a learning data acquiring unit 13 and a model learning unit 14.

The learning data acquiring unit 13 can acquire learning data required for a neural network model for classifying and recognizing data.

The model learning unit 14 can perform learning such that a neural network model has a determination reference about how to classify predetermined data, using the acquired learning data. In this case, the model learning unit 14 can train a neural network model through supervised learning that uses at least some of learning data as a determination reference. Alternatively, the model learning data 14 can train a neural network model through unsupervised learning that finds out a determination reference by performing learning by itself using learning data without a map. Further, the model learning unit 14 can train a neural network model through reinforcement learning using feedback about whether the result of situation determination according to learning is correct. Further, the model learning unit 14 can train a neural network model using a learning algorithm including error back-propagation or gradient decent.

When a neural network model is learned, the model learning unit 14 can store the learned neural network model in the memory. The model learning unit 14 may store the learned neural network model in the memory of a server connected with the AI device 10 through a wire or wireless network.

The data learning unit 12 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessing unit. The selected learning data can be provided to the model learning unit 14.

Further, the data learning unit 12 may further include a model estimator (not shown) to improve the analysis result of a neural network model.

The model estimator inputs estimation data to a neural network model, and when an analysis result output from the estimation data does not satisfy a predetermined reference, it can make the model learning unit 12 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 17 can transmit the AI processing result by the AI processor 11 to an external electronic device. For example, the external electronic device may include a monitoring camera, a Bluetooth device, an autonomous vehicle, a robot, a drone, an AR device, a mobile device, a home appliance, etc.

Meanwhile, the AI device 10 shown in FIG. 1 was functionally separately described into the AI processor 11, the memory 15, the communication unit 17, etc., but it should be noted that the aforementioned components may be integrated in one module and referred to as an AI module.

According to the present disclosure, one or more of a monitoring camera, an autonomous vehicle, a user terminal, and a server may be associated with an artificial intelligence module, a robot, an AR (Augmented Reality) device, a VR (Virtual Reality) device, a device associated with 5G services, etc.

Figure 2:
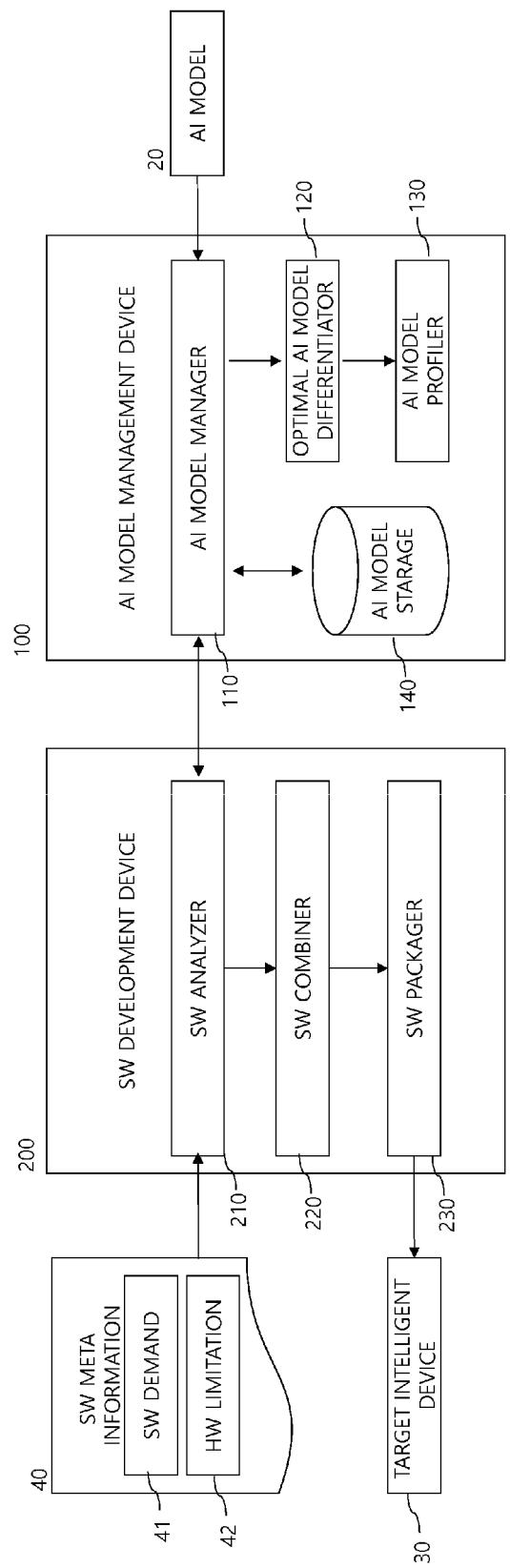
FIG. 2 is a diagram illustrating a system for implementing a method of providing intelligent software according to an embodiment of the present disclosure.

The AI device shown in FIG. 10 hereafter may be obviously a component of a device creating the AI model and/or a target intelligent device 30 in FIG. 2. The learning model (deep learning model 16) stored in the target intelligent device 30 may be a learning model trained by an intelligent device itself or a learning model transmitted from an external server.

Figure 3:
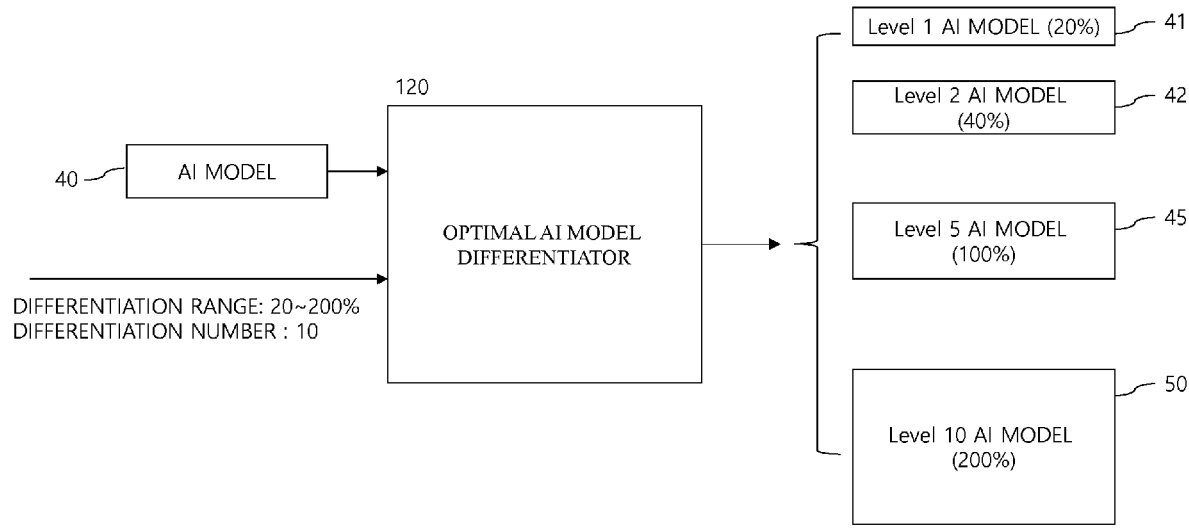
FIG. 3 is a diagram illustrating creation of an AI differentiation model according to an embodiment of the present disclosure.

FIG. 2 is a diagram illustrating a system for implementing a method of providing intelligent software according to an embodiment of the present disclosure. FIG. 3 is a diagram illustrating creation of an AI differentiation model according to an embodiment of the present disclosure.

Referring to FIG. 2, a system for providing intelligent software according to an embodiment of the present disclosure may include an AI model management device 100 and a software development device 200. The target intelligent device 30 may be registered to provide software through the system.

The software development device 200 selects optimal intelligent software to be installed in the target intelligent device 30 from the AI model management device 100 and enables the selected software to be driven in the target intelligent device 30.

For this purpose, the AI model management device 100 can provide storing, updating, and searching functions for AI models to develop intelligent software. The AI model management device 100 may be implemented as a cloud computing device, a server included in a network, an edge computing device, etc. The AI model management device 100 may be changed in various ways without being limited to the device described above.

The software development device 200 may be a device that develops intelligent software included in at least one AI model on the basis of software meta information.

AI model management device 100 may include an AI model manager 110, an optimal AI model differentiator 120, an AI model profiler 130, and an AI model storage 140.

The AI model management device 100 differentiates, creates, and manages an optimal AI model so that an AI model developed by an AI expert for various purposes including image processing, voice recognition, natural language processing, etc. regardless of hardware can be appropriately used for various intelligent devices limited in computing resource.

The AI model manager 100 can perform storing, updating, and searching functions on the AI model. The AI model manager 100 manages AI models developed and registered by AI experts. The AI model manager 100 can receive requests for selecting and providing an AI model optimized to the target intelligent device 30 on the basis of meta information of the target intelligent device 30 from the software development device 200.

The optimal AI model differentiator 120 can differentiate an AI model registered through the AI model manager 100 by an AI expert into several AI models. The AI differentiation model may mean differentiating an AI model developed not in consideration of the specifications of hardware into an optimized type that is suitable for intelligent software in which hardware limitations (e.g., the memory size, the CPU/GPU specifications, etc.) of a specific intelligent device.

In accordance with an embodiment, referring to FIG. 1, AI model differentiation may be differentiated into several AI models, depending on the AI model differentiation levels. The AI model differentiation levels, as shown in FIG. 3, may be stored in advance in accordance with the differentiation range and differentiation number in the AI model manager 110. The differentiation range and/or the differentiation number may be set by a user who registers the AI model 40. According to the AI model differentiation, AI models 41 and 42 at a differentiation level under 100% on the basis of a registered AI model 40 (100%) may be differentiated through a light-weighting technique including pruning, binarization, quantization, knowledge distillation, neural architecture search, AutoML, etc. Further, an AI model 50 of a differentiation level corresponding to 100% may be differentiated through heavy-weighting of AI model including Knowledge distillation, neural architecture search, AutoML, etc. The light-weighting technique or the heavy-weighting technique are examples and not limitative.

An AI model is trained to perform specific functions, and the size, calculation amount, etc. of a learning model may be changed in accordance with the amount of learning data. For example, in order to accomplish high accuracy in image classification, it is possible to improve accuracy by making the size of an AI model large when the amount of learning data is sufficiently large. However, when the amount of learning data is small, it is possible to improve the accuracy by making the size of an AI model relatively small in order to prevent over-fitting. As described above, an AI model that has been developed can show an optimal effect for a specific purpose and a given situation (data), but when the hardware specification of an applied device are changed and there is a hardware limitation in implementation of an AI model, it may not show the optimal effect.

For example, when there is a hardware limitation of a target device, an AI model developed in a large size to achieve high accuracy due to a large amount of learning data may generate calculation delay, or the AI model may not be used due to a memory limitation. In this case, light-weighting of the AI model may be needed. Further, for example, an AI model developed in a small size to prevent over-fitting may not show sufficient performance due to a deficit of its power of expression although learning data are sufficiently secured in a specific industry and higher accuracy can be achieved. In this case, heavy-weighting of the AI model may be needed.

Light-weighting of an AI model may be classified, in a broad meaning, into a light-weighting technique that does not need specific learning and a light-weighting technique that needs additional tuning (learning). When learning is not required, it corresponds to pruning, binarization, and quantization, and has a feature that the higher the light-weighting level, the lower the accuracy. On the contrary, the light-weighting technique that needs tuning corresponds to knowledge distillation, neural architecture search, AutoML, and a feature of this technique is that model tuning that uses learning data may be required due to creating of an AI model having a new structure from a developed AI model. Further, in heavy-weighting of an AI model including knowledge distillation, neural architecture search, AutoML, etc., new parameters are added, so it is necessarily required to tune (learn) the parameters through learning data.

AI model differentiation may be performed in accordance with a predetermined differentiation level regardless of the hardware specifications in the optimal AI model differentiator 120. However, since differentiation is performed regardless of the hardware specifications, a model optimized for the hardware limitations of a target device, which is registered, in the differentiated AI models stored in the AI model management device 100. In this case, an optimal AI model according to software demands and hardware limitations derived in the process of analyzing intelligent software in the software development device (200 in FIG. 2) may be differentiated into an on-demand type.

The AI model profiler 130 can create profile information including accuracy, execution time, a resource use amount by analyzing the performance of AI differentiation models. Profile information such as the accuracy, the processing speed (execution time) for each intelligent device, and a resource use amount of AI differentiation models is required so that the AI model profiler 130 selects an optimal AI differentiation model according to the software demands and hardware limitations analyzed by the software development device 200.

The accuracy about a test dataset of AI models changes from the original AI model before differentiation, so it is required to new accuracy through accuracy estimation about the dataset used in the process of developing the original AI model. The size and accumulation amount of AI differentiation models may be changed, depending on light-weighting or heavy-weighting. Further, the profile information such as the processing speed and the resource use amount may be changed in accordance with the hardware specifications of a target device even if AI differentiation models are differentiation models at the same level. Accordingly, such profile information may be derived by estimating AI differentiation models for target intelligent devices.

The AI model storage 140 stores the created profile information together with differentiated optimal AI models.

The software development device 200 can simply configure intelligent software optimized for a specific intelligent device in AI models including an optimal AI model (AI differentiation models) stored in the AI model storage 140.

Software meta information 40 including software demands 41 for intelligent software and hardware limitations 42 of a target intelligent device may be input to the software development device 200 together with registration of the target intelligent device 30.

A software analyzer 210 may select and receive (e.g., download) optimal AI models from the AI model management device 100 on the basis of the software meta information 40.

A software combiner 220 may combine the downloaded optimal AI models with the software logic used in the registered target intelligent device. For example, when a target intelligent device performs a function of recognizing and tracking an object, the software development device 200 may select an object recognition model optimized in the AI model management device 100 and models for tracking an object, and the software combiner 220 may insert the selected AI models into functions included in the software logic used by the target intelligent device.

A software packager 230 may convert it into an execution file, which can be executed in the target intelligent device 30, on the basis of intelligent software combined with a software-dependent and AI model-dependent libraries, and may transmit the execution file to the target intelligent device 30.

Figure 4:
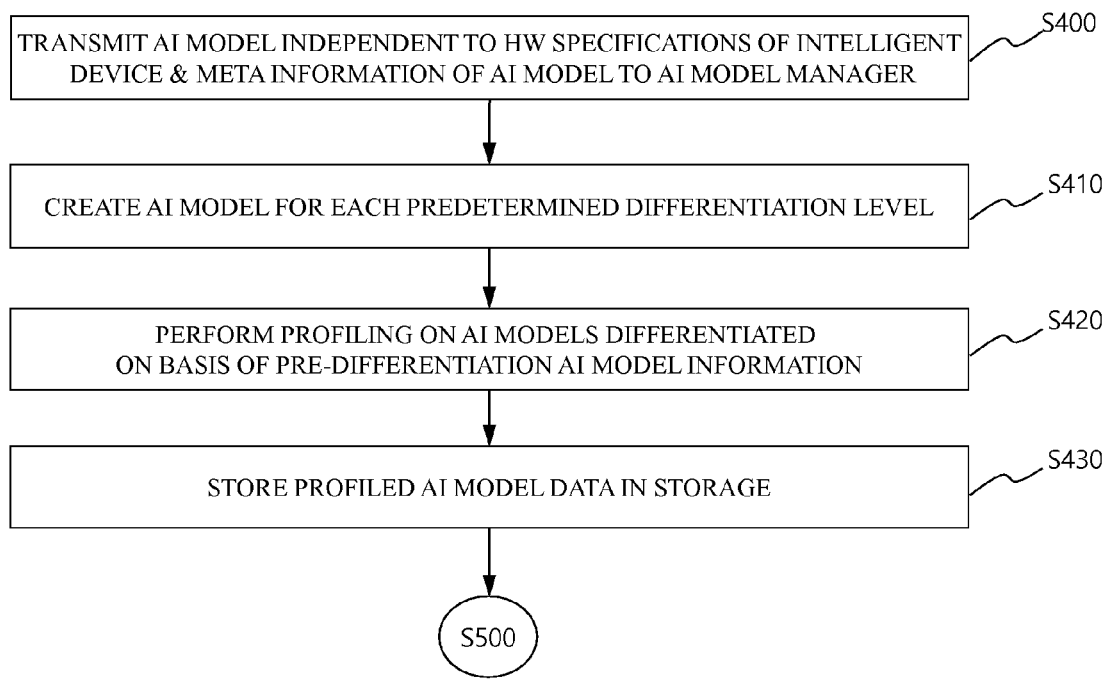
FIG. 4 is a flowchart of a method of providing intelligent software according to an embodiment of the present disclosure.

FIG. 4 is a flowchart of a method of providing intelligent software according to an embodiment of the present disclosure.

In the specification referring to FIG. 2, in the AI model management device 100 and the software development device 200 that are discriminated, the AI model management device 100 performs the functions of registering, differentiating, and searching for AI models and the software development device 200 performs the function of analyzing intelligent software demands and receiving an optimal AI differentiation model from the AI model management device 100 on the basis of meta information of the target intelligent device 30. Further, the sub-function blocks of the AI model management device 100 and the software development device 200 were described in FIG. 2 for the convenience of description. However, hereafter, it is assumed that the operations that are performed by the AI model manager 110, the optimal AI model differentiator 120, the AI model profiler 130, and the AI model storage 140 are performed by the AI model management device 100 for the convenience of description about the flow of the method of providing intelligent software according to an embodiment of the present disclosure in FIGS. 4 and 5. The software development device 200 is also applied in the same way. However, it is apparent that, in FIG. 2, the AI model management device 100 and the software development device 200 may be designed such that the operations thereof are provided as independent modules or provided in one module to be performed by one processor or processors, respectively.

Referring to FIG. 4, the AI model management device 100 may receive a pre-trained AI model and meta information of the AI model (S400). The pre-trained AI model may be a model that is not dependent to the specifications of a target intelligent device. The meta information of the AI model may be information that explaining the AI model. The meta information of the AI model may include the classification category (e.g., image classification, object recognition, speaker recognition, voice recognition, etc.), model size, and accuracy information of the AI model. The target intelligent device may be an edge type device.

The AI model management device 100 may create a plurality of AI differentiation models from the AI model in accordance with a plurality of differentiation levels (S410). As described with reference to FIG. 3, the differentiation level (range, number, etc.) may be set in advance by a user or may be set to be optimal for the specifications of a registered target intelligent device. When differentiation is performed in accordance with the specifications of the target device, the size and calculation amount of an AI model may not exceed the maximum specifications of the registered intelligent device and may be created in accordance with one or more predetermined optimization levels to support intelligent software development in which two or more AI models are simultaneously operated in the target device.

The AI model management device 100 may profile the AI model on the basis of pre-AI model information. The AI model profiler estimates accuracy for the differentiated optimal AI models using an estimation dataset for each classification category and analyzes the execution time and resource use amount according to the hardware specifications of a registered target intelligent device, thereby creating a profile for each optimal AI model and each hardware specification.

The AI model management device 100 may store AI model data including the meta information of the AI model, the AI differentiation model, the hardware specifications of the device, and the profile information in the storage (S430). The files that are stored in the storage may include AI meta information, a differentiation (light or heavy) AI model, hardware specification information, and a profile.

Meanwhile, the AI model management device 100 may receive demands of a target device and may select and transmit a first model, which satisfies the demands from the AI model data stored in the storage, to the target device.

Figure 5:
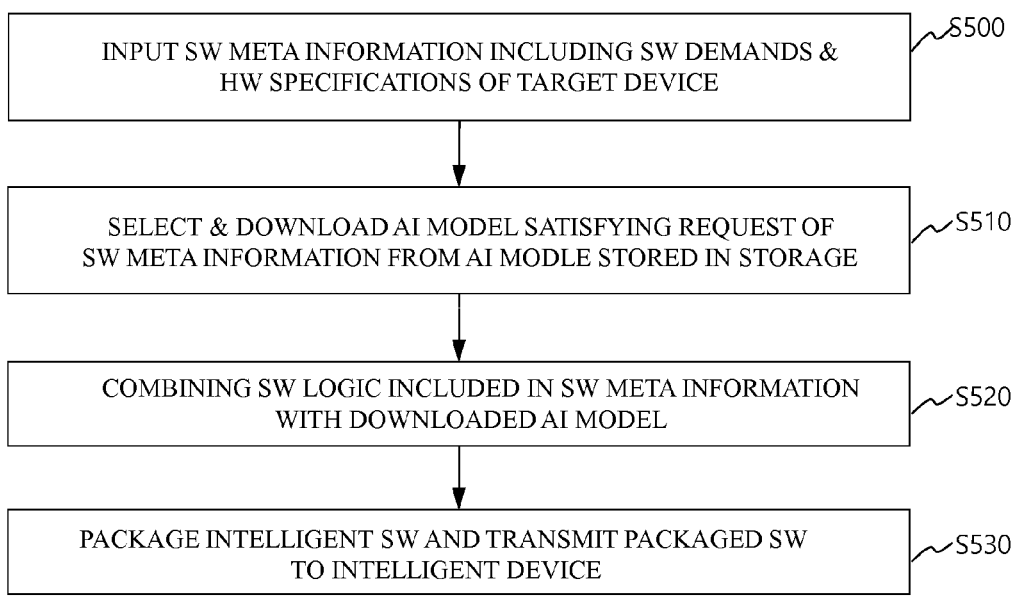
FIG. 5 is another example of a flowchart of a method of providing intelligent software according to an embodiment of the present disclosure.

FIG. 5 is another example of a flowchart of a method of providing intelligent software according to an embodiment of the present disclosure. FIG. 5 shows operations that are performed in the software development device 100.

The software development device 200 may receive software information including software demands and hardware specifications of a target device (S500). The software demands may include a target accuracy level, an inference speed, a priority, an logic and entire execution time of intelligent software, and accuracy for the AI models included in intelligent software. The intelligent software may mean software that is mounted and driven in a target intelligent device before an optimal AI model is combined. Further, the hardware specifications may include the specifications of a CPU, a GPU, and a memory of a target intelligent device.

The software development device 200 may select a first AI model that satisfies the software meta information from the AI model data included in the storage (S510). The software development device 200 may select and download an optimal AI model that satisfies the software meta information from an AI model data list that can be used in the AI model management device 100.

The AI model management device 100 may create software for the target device by combining the software logic included in the software meta information and the first AI model (S520). Here, the software meta information, which is software meta information constructed by a developer of the intelligent software for the target intelligent device, includes a software logic and assembles intelligent software that is available for a target intelligent device by combining downloaded AI models with the logic.

The software development device 100 may convert the combined software into an execution file and transmit the execution file to the target device to be executable in the target device (s530).

A tool and method of developing HW-optimized intelligent software on the basis of an AI differentiation technique for developing an intelligent device was described above. According to an embodiment of the present disclosure, a developer of software for an intelligent device is enabled to easily develop intelligent software including one or more AI functions even if the developer has insufficient expert knowledge about artificial intelligence and AI light-weighting (heavy-weighting) by creating an execution file for intelligent software suitable for a target device by selecting an optimal AI model according to intelligent software meta information.

The AI model management device 100 disclosed herein, similar to Python의 pip(Python Package Index) by Python and npm(Node Package Manager) by node. js, can be act as a motive of growth of an intelligent software development field for an intelligent device because it becomes easy to development intelligent software that supports various intelligent IoT services by managing and sharing intelligent models for developing intelligent software in a software library type.

Further, the software development device 200 disclosed herein can be operated separately from the AI model management device. Accordingly, an intelligent device developer and an AI software developer support each other to be able to programs and technologies without being dependent to expert knowledge, so the time and cost for learning expert knowledge are minimized, and accordingly, the work efficiency can be increased.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

What is claimed is:

1. A method of providing intelligent software, the method comprising:
   receiving a pre-trained AI model and meta information of the AI model;
   creating a plurality of AI differentiation models from the AI model in accordance with a plurality of differentiation levels;
   performing profiling on the AI differentiation models on the basis of pre-differentiation AI information;
   storing AI model data, which includes the meta information of the AI model, the AI differentiation models, hardware specifications of the device, and the profile information, into a storage; and
   receiving demands of a target device, and selecting a first model, which satisfies the demands, from the AI model data stored in the storage, and transmitting the first model to the target device.

2. The method of claim 1, further comprising:
   receiving software meta information including software demands and hardware specifications of a target device;
   selecting a first AI model that satisfies the software meta information from AI model data stored in the storage;
   creating software for the target device by combining a software logic included in the software meta information with the first AI model; and
   converting the combined software into an execution file and transmitting the execution file to the target device to be executable in the target device.

3. The method of claim 1, wherein the performing of profiling is creating profile information including accuracy of the AI differentiation models, and an execution time and a resource use amount according to hardware specifications of a device registered in advance.

4. The method of claim 1, wherein the pre-trained AI model is independent to hardware specifications of a device, and the AI meta information includes the function, size, and accuracy of the AI model.

5. The method of claim 1, wherein the differentiation levels include information of predetermined differentiation range and differentiation number.

6. The method of claim 5, wherein the differentiation levels include any one of light-weighting or heavy-weighting of the Al model, the light-weighting includes at least one of pruning, binarization, quantization, knowledge distillation, neural architecture search, or AutoML, and the heavy-weighting includes at least one of knowledge distillation, neural architecture search, or AutoML.

7. The method of claim 5, further comprising receiving a differentiation request according to a specific demand and limitation according to hardware specifications of the intelligent device, and differentiating the AI model in accordance with the differentiation request when a model that satisfies the hardware specifications of the intelligent device does not exist in the plurality of differentiation models stored in the storage.

8. A system for providing intelligent software, the system comprising:
   an AI model management device that manages an AI model by receiving a pre-trained AI model and meta information of the AI model; and
   a software development device, when a target device is registered, that selects a first AI model satisfying software meta information, which includes software demands and hardware specifications of the target device, from AI models managed by the AI model management device on the basis of the software meta information, and that packages and transmits the first AI model to the target device to be executable in the target device,
   wherein the AI model management device includes:
   an AI model differentiator that creates a plurality of AI differentiation models from the AI model in accordance with a plurality of differentiation levels;
   an AI profiler that performs profiling on the AI differentiation models on the basis of pre-differentiation AI information; and
   an AI model storage that stores AI model data including the meta information of the AI model, the AI differentiation models, hardware specifications of the device, and the profile information.

9. The system of claim 8, wherein the software development device includes:
   a software analyzer that selects a first AI model satisfying the software meta information from the AI model data stored in the storage;
   a software combiner that combines software for the target device by combining a software logic included in the software meta information with the first AI model; and
   a software packager that converts the combined software into an execution file to be executable in the target device.

* * * * *